United States Patent [19]

van den Enden et al.

[11] Patent Number: 4,477,696

[45] Date of Patent: Oct. 16, 1984

[54] CONFERENCE SYSTEM FOR TELEPHONY

[75] Inventors: Adrianus W. M. van den Enden; Job F. P. van Mil; Aloysius J. Nijman, all of Eindhoven, Netherlands

[73] Assignee: U.S. Philips Corporation, New York, N.Y.

[21] Appl. No.: 323,621

[22] Filed: Nov. 20, 1981

[30] Foreign Application Priority Data

Dec. 1, 1980 [NL] Netherlands ......................... 8006518

[51] Int. Cl.$^3$ ............................................. H04M 3/56
[52] U.S. Cl. ................................................ 179/18 BC
[58] Field of Search ......................... 179/1 CN, 18 BC

[56] References Cited

U.S. PATENT DOCUMENTS 4,425,478  1/1984  van Mil ........................... 179/18 BC Primary Examiner—Gene Z. Rubinson
Assistant Examiner—L. Schroeder
Attorney, Agent, or Firm—Thomas A. Briody; William J. Streeter

[57] ABSTRACT

A conference system comprises a conference circuit to which a plurality of participants are connected via terminals respective connecting circuits having input and output circuits, the signal from the output circuits being fed to the connecting circuit and signals from the conference circuit being fed lines to the input circuits. The conference circuit has summing amplifiers (10 to 13) whose inputs are connected to the outputs of the connecting circuits so that the output signals from the connecting circuits are algebraically summed. The signs of the signals to be summed are determined from the relationship $E - S^* S = O$ where E is the unity matrix and $S^*$ is the transposed complex conjugate matrix of S.

6 Claims, 7 Drawing Figures

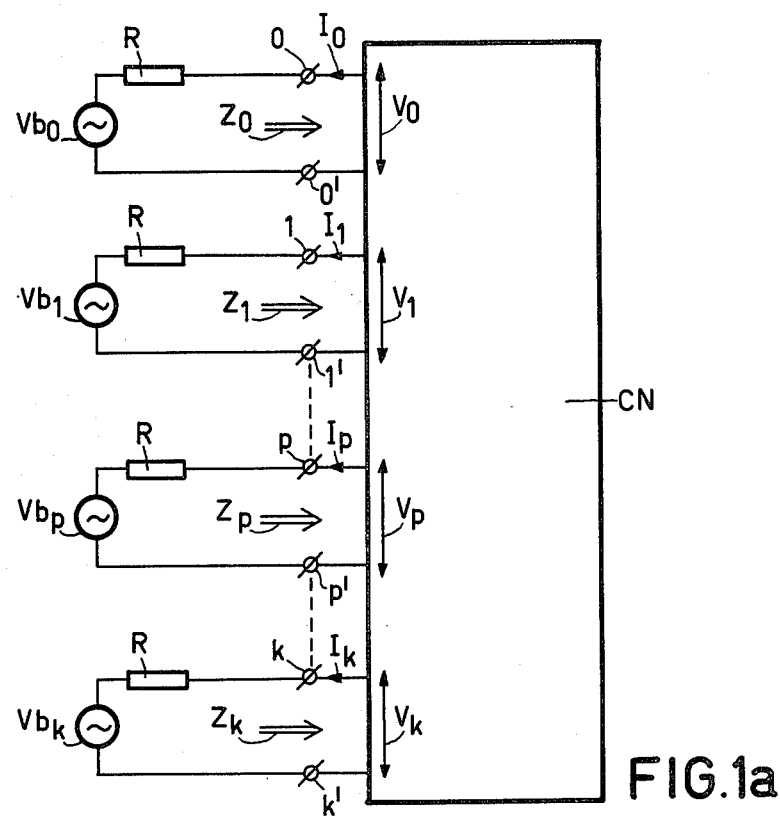

$$S = \frac{1}{\sqrt{7}} \begin{pmatrix} 0 & +1 & +1 & +1 & -1 & -1 & +1 & -1 \\ +1 & 0 & +1 & +1 & +1 & -1 & -1 & +1 \\ -1 & +1 & 0 & +1 & +1 & +1 & -1 & -1 \\ +1 & -1 & +1 & 0 & +1 & +1 & +1 & -1 \\ +1 & +1 & -1 & +1 & 0 & +1 & +1 & +1 \\ -1 & +1 & +1 & -1 & +1 & 0 & +1 & +1 \\ -1 & -1 & +1 & +1 & -1 & +1 & 0 & +1 \\ -1 & -1 & -1 & +1 & +1 & -1 & +1 & 0 \end{pmatrix}$$

CONFERENCE SYSTEM FOR TELEPHONY

BACKGROUND OF THE INVENTION

1. Field of the Invention

The invention relates to a conference system for establishing a simultaneous interchange of information among a plurality of subscribers, comprising a conference circuit for information signals of the conference, a connecting circuit for connecting each participant to the exchange of information on the conference circuit, each connecting circuit being formed by an output circuit for transmitting the information from a participant to the conference circuit and an input circuit for receiving the information from the conference circuit for said participant, the conference circuit being arranged for receiving input information signals from the output circuit of each of the connecting circuits and for applying output information signals to the input circuit of each of the connecting circuits, said output information signals comprising the algebraic sum of the input information signals of each of the further output circuits with a predetermined phase and a predetermined amplitude ratio.

2. Description of the Prior Art

Such a conference system is disclosed in U.S. Pat. No. 4,049,920. The output information signal which is transmitted from the conference circuit to the connecting circuits of each individual participant comprises, as stated in the foregoing, the algebraic sum of the input information signals of the further participants. The phase of these input information signals (the sign of the contribution to the algebraic sum) is empirically chosen so that instabilities due to oscillation are prevented to the maximum possible extent: the output information signals are transmitted to the participants where they are partly retransmitted due to hybric circuit impefections. A disadvantage of this system is that the insertion losses of the conference circuit are comparatively high.

The invention has for its object ot provide a conference system of the type described in the foregoing which, while maintaining absolute stability has lower losses. The invention provides a conference system as described in the opening paragraph characterized in that the phase is chosen so that the matrix S which represents the said algebraic relationship between the output information signals and the input information signals is defined by the relation $E - S^*S \simeq 0$, wherein E is the unity matrix and $S^*$ is the transposed complex conjugate matrix of S.

It should be noted that reference (1) mentioned at the end of the description states (§ 3.2) that ideal two-wire conference circuits can be designed which are assembled from ideal transformers. Conference circuits of that type are possible for $4N+2$ participants, where N is an integer, i.e. for (2), 6, 10, ... participants. FIG. 11 and FIG. 12 of the said publication show implementations of conference circuits for 6 and 10 participants, respectively. These implementations have been found possible as the S-matrix of the circuit is symmetrical, so that it is possible to realize an ideal conference circuit in the manner disclosed, using reciprocal network elements.

Reference (1) further states (§ 3.4) that in theory a four-wire ideal conference circuit is also possible for $2N+2$ participants. In that case, however, the S-matrix is not symmetrical, which means that inter alia non-reciprocal network elements are required for the realisation of such a conference circuit. However, an implementation of an ideal four-wire conference circuit is missing.

SUMMARY OF THE INVENTION

The conference system in accordance with the invention is based on the recognition of the fact that a four-wire conference circuit for an even number of participants can be provided, wherein the participants are coupled to the conference circuit via a full duplex two-wire connection and wherein, viewed from the participant side, an ideal conference circuit is realized. The connecting matrix of the four-wire conference circuit is then reduced (reference (2), cf. (1)) from the order $(2N+2)$ to the order $(N+1)$. The insertion loss achieved with the system in accordance with the invention is very low. Thus, a conference circuit for 8 subscribers has only a loss of 8.5 dB, while the prior art system mentioned in the foregoing results in a loss of 15.8 dB, if an absolute stability is required for both circuits. The fact that the conference circuit in accordance with the invention is lossless is a definite proof that the circuit is absolutely stable.

Embodiments of the invention illustrating its advantages will now be described by way of example, with reference to the accompanying drawing.

BRIEF DESCRIPTION OF THE DRAWINGS

FIG. 1a shows a general (block) schematic diagram of a two-wire conference network for $K+1$ participants;

FIG. 1b shows a matrix of the S parameters, the S-matrix, of the conference network shown in FIG. 1a;

FIG. 2a shows a possible connecting matrix of a conference system for four participants in accordance with the invention;

FIG. 2b shows an embodiment of a conference system for four participants having a connecting matrix as shown in FIG. 2a;

DETAILED DESCRIPTION OF THE PREFERRED EMBODIMENTS

Figures 2A, 2B:
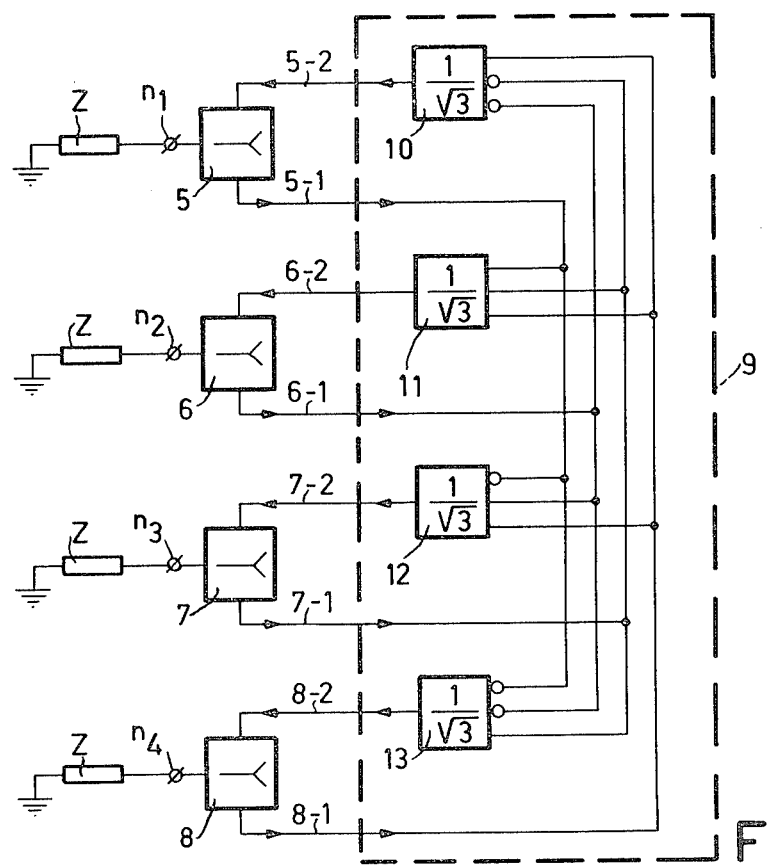

The analysis of the four-wire conference circuit is based on a two-wire conference network which is known per se, as shown in FIG. 1a. Some parameters which are of importance for conference circuits will be defined with reference to FIG. 1a. The conference circuit CN for $(K+1)$ two-wire participants comprises $(K+1)$ input ports denoted by indices O—O' to k—k', inclusive. Let the input impedance Z of any port p—p' be Zp, the input current Ip, the port voltage Vp and the port be supplied from a voltage source Vbp through an impedance R. The further ports and port parameters are defined in a corresponding way. The conference circuit shown in FIG. 1a is called an ideal circuit, i.e. it has a very low insertion loss, is loss-less and absolutely stable, provided the following three requirements are satisfied. The first requirement is that the input impedance Z of all ports is equal to the source impedance of the voltage source connected to that part. In that event the maximum transfer of power from the source to the conference network is ensured. Consequently, $Z_p = R$ for $p=0, 1, 2, \ldots k$. The power $P_{in}$ applied to port P by the source producing voltage $V_{bp}$ is equal to $V_{bp}^2/4R$. The second requirement is that the attenuation from each port to all the other ports is equal. This means that the power $P_{in}$ supplied, for example, to port p—p' is equally distributed over the remaining K ports; consequently, the portion of the power of port p—p' which is available at each other port is $P_{off} = P_{in}/K$. Thus, the insertion loss IL of the conference network CN is equal to 10 log 10 (K). As an ideal circuit neither dissipates nor reflects power; the attenuation is exclusively the result of the equal distribution of the power produced over the remaining K ports. Finally, the third requirement is that the conference circuit CN must be loss-less. From publications (1, 2, 3) it is known that an essential condition for the existence of such a reciprocal/ideal network is that the conference network should be arranged for a number of participants equal to $4K = 2$.

To enable the realisation of a four-wire conference circuit the description, contained in the foregoing of the two-wire conference circuit will now be repeated on the basis of S-parameters. The elements of an S-matrix are distinguished into the element outside the main diagonal, denoted by $S_{qp}$ and the element on the main diagonal $S_{pp}$. Then, $S_{qp}$ is the square root of the ratio between the complex output voltage $P_{off}$ at port q—q' and the maximum power $P_{in}$ produced by the generator at port p—p'. (All voltage sources $V_b$ except $V_{bp}$ are assumed to be zero). Consequently:

$$S_{qp} = \sqrt{\frac{P_{off}}{P_{in}\max}} = \sqrt{\frac{I_q^2 R}{V_{bp}^2/4R}} = \frac{2I_q R}{V_{bp}}$$

$S_{qp}$ denotes what portion of the maximum power available from port p—p' is transmitted ("scattered") to port q—q'. The insertion loss IL may be desined from the expression $IL = 10 \log_{10}(1/S_{qp}^2)$. The elements of the S-matrix on the main diagonal, $S_{pp}$, represent the square root of the ratio of the complex reflected power at part p to the maximum power available from port p—p' of the generator. Thus:

$$S_{pp} = \frac{R - Z_p}{R + Z_p}$$

$S_{pp}$ denotes what portion of the maximum power available on port p—p' is reflected by port p—p'. If the conference network thus characterized in terms of S-parameters is ideal, then it must satisfy the three requirements stated hereinbefore:

— $S_{pp} = 0$, as the input impedance $Z_p$ must be equal to the source impedance R.

— $S_{qp} = |s|$ for all $p \neq q$, as the power applied to port q from port p is equal to the power applied to the remaining ports. Thus, the S-matrix of the order (K+1) of the conference circuit CN has the form shown in FIG. 1b.

The third requirement, namely that the conference circuit must be lossless is in terms of the S-parameters $E - S^*S = 0$, where $S^*$ denotes the transposed complex conjugate of S and E denotes the unity matrix. By means of this condition it is possible to determine the elements of the S-matrix (or more accurately, the signs thereof), as is demonstrated in the publications (1, 2, 3) mentioned hereinbefore. The minimum insertion loss of the lossless conference circuit, $10 \log_{10}(K)$, is obtained for $s = i/\sqrt{K}$.

FIG. 2a shows a S-matrix for a four-port conference circuit (K=3). A conference system for 4 full duplex two-wires subscribers can be realised in the manner shown in FIG. 2b. Four participants, denoted schematically in the Figure by their impedances Z are connected to the four terminals $n_1$, $n_2$, $n_3$ and $n_4$ of the respective connecting circuit 5, 6, 7 and 8. Each connecting circuit 5, 6, 7 and 8 comprises an input and an output circuit, not further shown in the Figure. The output circuit of connecting circuit 5 transmits information from participant 1 to the conference circuit 9, via a conductor 5-1 and the input circuit of connecting circuit 5 receives information from the conference circuit 9 via a conductor 5-2. Likewise, participant 2 transmits information to the conference circuit 9 via connecting circuit 6 and conductor 6-1 and receives information from the conference circuit 9 via conductor 6-2. The same procedure holds for participants 3 and 4. The conference circuit 9 comprises four summing amplifier circuits 10, 11, 12 and 13, each having three inputs and an output. Inverting inputs of the summing amplifier circuits are indicated by means of a circle. The summing amplifier circuits, 10, 11, 12 and 13 sum the input signals and amplify (multiply) them by a fixed value, namely $1/\sqrt{3}$. The inputs of each of the summing amplifier circuits 10-13 are connected to the output circuits of the connecting circuits of the other participants in a manner shown in FIG. 2a. The matrix shown in FIG. 2a is the connecting matrix for the embodiment of the conference circuit shown in FIG. 2b. Namely, the signal in conductor 5-2 corresponds to the first row vector of matrix S of FIG. 2a. The first element, 0, of this factor is an indication that the first participant does not contribute towards the signal produced by the conference circuit conductor on 5-2. The second element, $-1$, is an indication that the contribution of participant 2 is inverted in phase before being transmitted to conductor 5-2, while the third element $-1$, is an indication that the contribution of participant 3 is also inverted in phase before being transmitted to conductor 5-2. The fourth element $+1$, finally, is an indication that the contribution of the fourth participant is transmitted to conductor 5-2 without any phase invertion.

The connecting circuits 5, 6, 7 and 8 can be realised by means of non-reciprocal networks such as, for example, passive or active hybrids and are assumed to be ideal. This implies, for example, that the signal coming from a participant is transmitted without attenuation to conductor 5-1 via $n_1$ and that consequently no signal is reflected by the hybrid. (To this end, it is essential that the balance impedance and the input impedance of the hybrids are equal to the subscriber's impedance R). In addition, the signal coming from the conference network is transmitted in its totality, for example via conductor 5-2, to participant $n_1$ and consequently no signal is transmitted from conductor 5-2 via the hybrid to conductor 5-1. In actual practice, the hybrids are, however not ideal. Thus, the hybrid will produce a certain attenuation when transmitting the signal from participant $n_1$ to the conductor 5-1. This is, however, no insurmountable disadvantage as, provided the remaining hybrids have the same attenuation, the gain factors $1/\sqrt{3}$ of the summing amplifier circuits 10-13 can be matched thereto. For a loss factor of ½ all gain factors might be chosen equal to $2/\sqrt{3}$. The common factor for the matrix shown in FIG. 2a is then also given this new value. It is alternatively possible that the participants in the conference have an unequal power level, for example because some participants are connected to the same local exchange and one or more other participants are connected to the conference circuit via one or even more higher order exchanges. In that case the gain factor for some participants must be adapted, which means for the S-matrix shown in FIG. 2a that the absolute values of all elements outside the main diagonal will not be equal to each other. For the embodiment shown in FIG. 2a this may be achieved by adapting the summing amplifier circuits 10-13 that the result of the addition which for circuit 10 is, for example, $-1_{6-1} -1_{7-1} +1_{8-1}$ is changed into: $-a_{6-1} -b_{7-1} +c_{8-1}$ with suitably chosen values for a, b and c.

In FIG. 2b the four-wire conference circuit 9 is directly connected to the hybrid circuits 5-8. It is, however, alternatively possible to include one or more (four-wire) exchange(s) between the conference cirucits and the hybrid circuits.

The insertion loss of the circuit shown in FIG. 2b is $10 \log_{10} 3 = 4.8$ dB. This value is obtained with ideal components. As mentioned in the foregoing this insertion loss occurs when the balance impedance of the hybrid circuit is equal to the subscriber's impedance Z. Should the subscriber's impedance deviate therefrom, which may easily occur as ever changing subscriber's are connected to the conference circuit then a certain degree of mismatch (hybrid circuit overflow) is the result.

This may change the insertion loss at the conference circuit. However, this applies equally to the prior art conference circuits. In spite of a possible mismatch the conference circuit remains lossless and, consequently, absolutely stable.

Figures 3A, 3B:
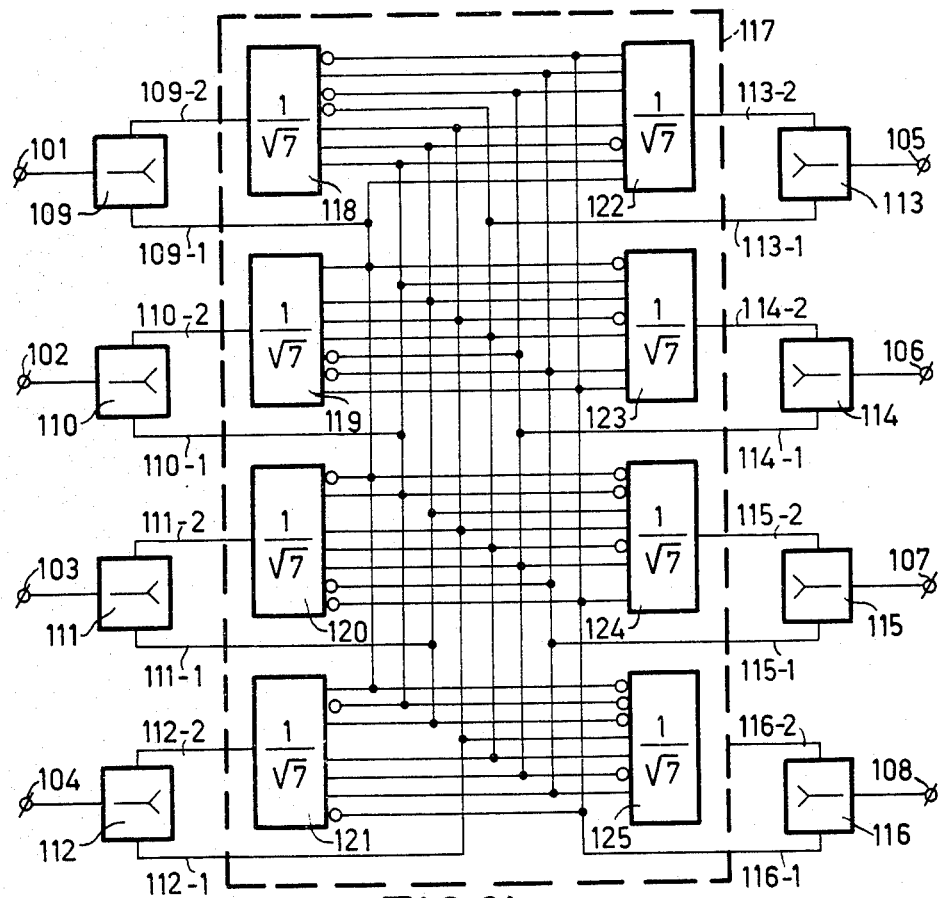
FIG. 3a shows a possible anticirculant connecting matrix of a conference system for eight participants in accordance with the invention.
FIG. 3b shows an embodiment of a conference system for eight participants in accordance with FIG. 3a and FIG. 4 shows the stability region in the complex Z-plane.

FIG. 3a shows an example of a connecting matrix for a conference system for eight participants. The signs of the elements of the S-matrix are determined in the manner described in the foregoing. FIG. 3b shows an embodiment of a conference system for eight full-duplex two-wire participants, this being an implementation of the connecting matrix shown in FIG. 3a. The eight participants 101-108 are each connected to a connecting circuit 109-116 by means of a full duplex two-wire connection. An output circuit (not shown) of each of the connecting circuits 109-116 is connected through a conductor 109-1 to 116-1 inclusive to the conference circuit 117 for transmitting the information of the relevant participant to the conference circuit. In addition, the connecting circuits 109-116 include an input circuit each of which is connected via a conductor 109-2 to 116-2, inclusive to the conference circuit 117 for receiving the information from the conference circuit for the relevant participant. The conference circuit 117 comprises eight summing amplifier circuits 118-125, a respective output of which is connected to the associated input circuit of that subscriber and comprises 7 inputs which are connected to the output circuits of the connecting circuits of the other participants. Consequently, each one of the summing amplifier circuits 118-125 applies the algebraic sum of input information signals of each of the further output circuits to the input circuit of the relevant connecting circuit, the phase being determined by the matrix shown in FIG. 3b. In order to obtain minimum insertion loss of the conference circuit, the gain factor of the summing amplifier circuits 118-125 should be equal to $1/\sqrt{K}$, or, in this case $1/\sqrt{7}$.

The connecting circuits 109-116 in FIG. 3b and also the connecting circuits 5-8 in FIG. 2b can be implemented by means of prior art hybrid port circuits, alternatively denoted hybrid networks. The constructions of the summing amplifier circuits 118-125 in FIG. 3b and 10-13 in FIG. 2b are prior art summing amplifier circuits, as described in, for example, the U.S. Pat. No. 4,049,920.

Figure 4:
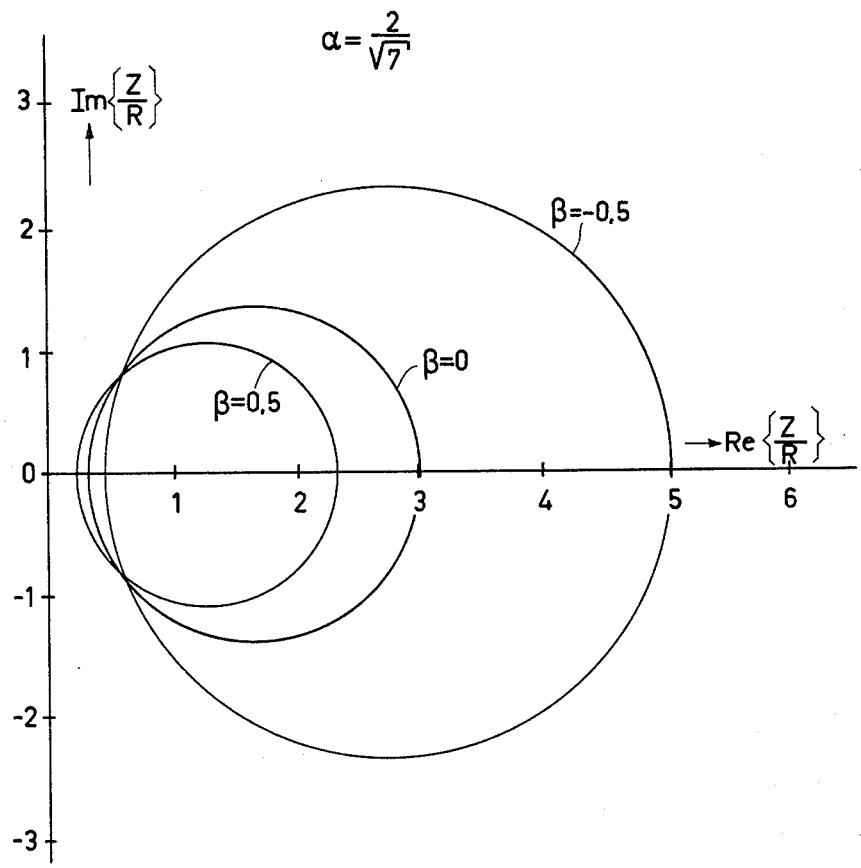

At the attenuation mentioned in the foregoing the conference system is absolutely stable which means, as mentioned in the foregoing, that the conference system is stable for any complex and passive impedance Z (FIG. 2b). In FIG. 4, where the imaginary portion of Z (standardized on the balance impedance R) Im (Z)/(R) is shown as a function of the real portion of Z. Re (Z)/(R) is the region in which the conference system is absolutely stable, i.e. the entire right-hand half-plane. If it is known, for example, that extremely high and extremely low subscriber's impedances Z do not occur, then the absolute stability requirement is unnecessarily severe. By requiring merely stability, i.e. stability in a predetermined impedance range (smaller than the right-hand half-plane) the attenuation of the conference network can be further reduced. In FIG. 4 the circle $\beta = 0$ encloses the area within which a conference system with eight participants (in accordance with FIG. 3b) is stable, the attenuation being only $20 \log_{10}(\sqrt{7}/2)$. This is obtained by giving the summing amplifiers 118-125 of FIG. 3b a gain ($\alpha$) which is twice as high, namely $\alpha = 2/\sqrt{7}$.

As described in applicants co-pending U.S. application Ser. No. 323,622, filed Nov. 20, 1981, which claims priority from Netherlands patent application No. 80 06519 it may be advantageous to retransmit the information input signal applied to the conference circuit by the connecting circuit of a given participant also to that given participant himself. This is also advantageous for the conference system which is the subject of the present application. The contents of said applicants' U.S. patent application Ser. No. 323, 622, filed Nov. 20, 1981, is incorporated in this description by reference.

If the conference system is stable within a limited area, for example the area within the circle denoted by $\beta = 0$, the stability region can be shifted by retransmitting the "own" information input signal to the participant with a gain factor $\beta(\beta \neq 0)$. FIG. 4 shows the stability region for $\beta = -0.5$ and the stability region for $\beta = +0.5$. It can be seen that for $\beta = -0.5$ the conference system is stable for more highly resistive impedances while for $\beta = +0.5$ the stability region shifts to a lower resistance impedance range. Thus, it has become possible to bring the area in which the conference system is stable in harmony with participant impedances occurring in actual practice.

References

1. V. Belevitch, Theory of 2n-terminal networks with applications to conference telephony, Elector. Comm, Sept. 1950, p. 231–244.
2. V-Belewitch, Synthesis of four-wire conference networks and related problems, Proc. Symposium on modern network synthesis, New-York, April 1955, p. 175–195.
3. V. Belevitch, Transmission losses in 2n-terminal networks, Jrnl. of Applied Physics, Vol. 19, July 1948, p. 636–638.

What is claimed is:

1. A conference system for establishing a simultaneous interchange of information among a plurality of subscribers comprising a conference circuit for information signals of the conference, a plurality of connecting circuits, one for connecting each participant to the conference circuit, each connecting circuit being formed by an output circuit for transmitting information from a participant to the conference circuit and an input circuit for receiving information from the conference circuit for that participant, the conference circuit being arranged for receiving information signals from the output circuit if each of the connecting circuits and for applying information signals to the input circuit of each of the connecting circuits, the information signal applied to the input circuit of each connecting circuit comprising the algebraic sum of the information signals received from the output circuits of each of the other connecting circuits with a predetermined phase and a predetermined amplitude ratio, each phase being chosen so that the matrix which represents the algebraic relationship between the information signals received from the output circuits and the information signal applied to each input circuit is determined by the relationship $E - S^*S \approx 0$, wherein E is the unity matrix and $S^*$ is the transposed, complex conjugate matrix of S.

2. A conference system as claimed in claim 1 wherein each of said amplitude ratios are equal.

3. A conference system as claimed in claim 2 wherein the amplitude of the information signals applied to the input circuits is equal to $1/\sqrt{K}$ times the sum of the information signals received from each of the further output circuits, wherein K is the maximum number of participants at the conference less 1.

4. A conference circuit as claimed in any one of the preceding claims wherein the connecting circuit is a non-reciprocal network.

5. A conference system as claimed in claim 4 wherein the connecting circuit is a hybrid port circuit.

6. A conference system as claimed in claim 5 wherein the information signal applied to each input circuit further comprises the information signal received from the output circuit of that participant with a predetermined amplitude ratio $\beta$.

* * * * *